J. BARNES.
SPEED TRANSMISSION MECHANISM.
APPLICATION FILED APR. 20, 1908.
983,016.
Patented Jan. 31, 1911.
2 SHEETS—SHEET 1.
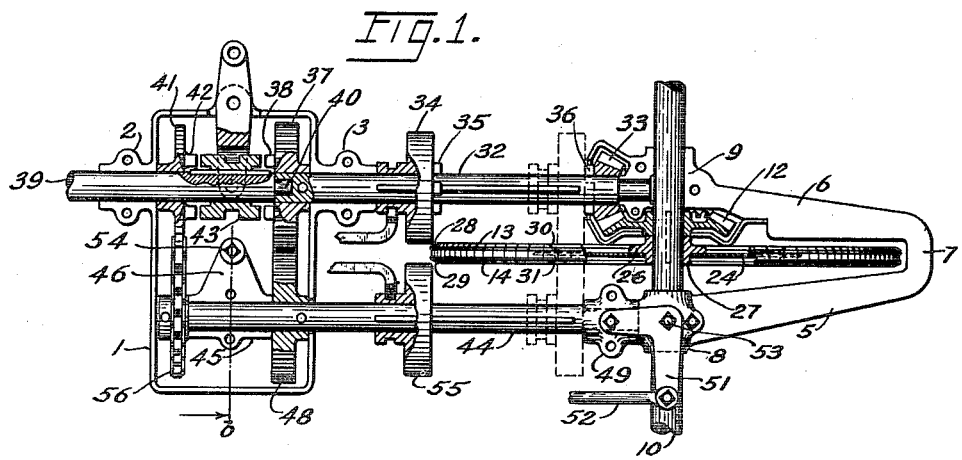
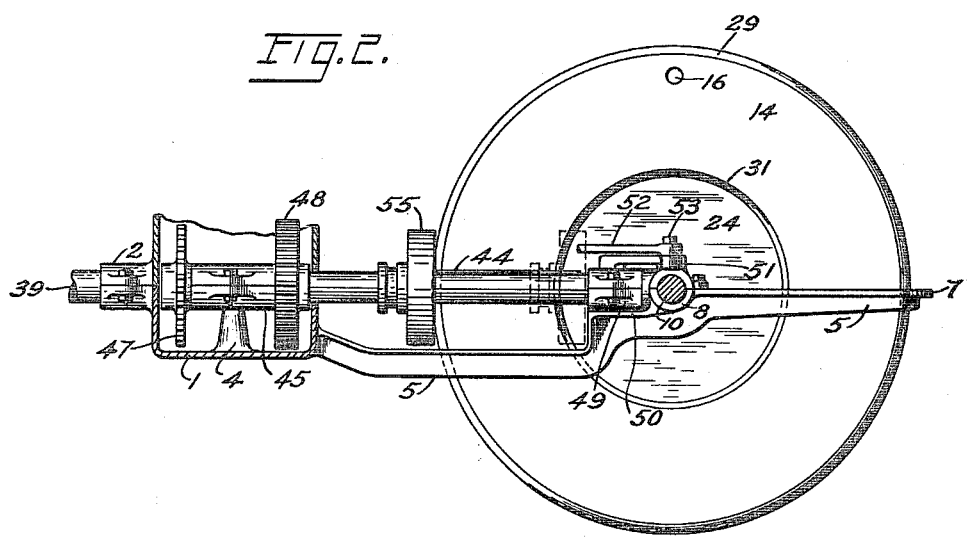
Witnesses:
J. O. Clark
E. Behel.
Inventor:
John Barnes.
By A. O. Behel
Atty.

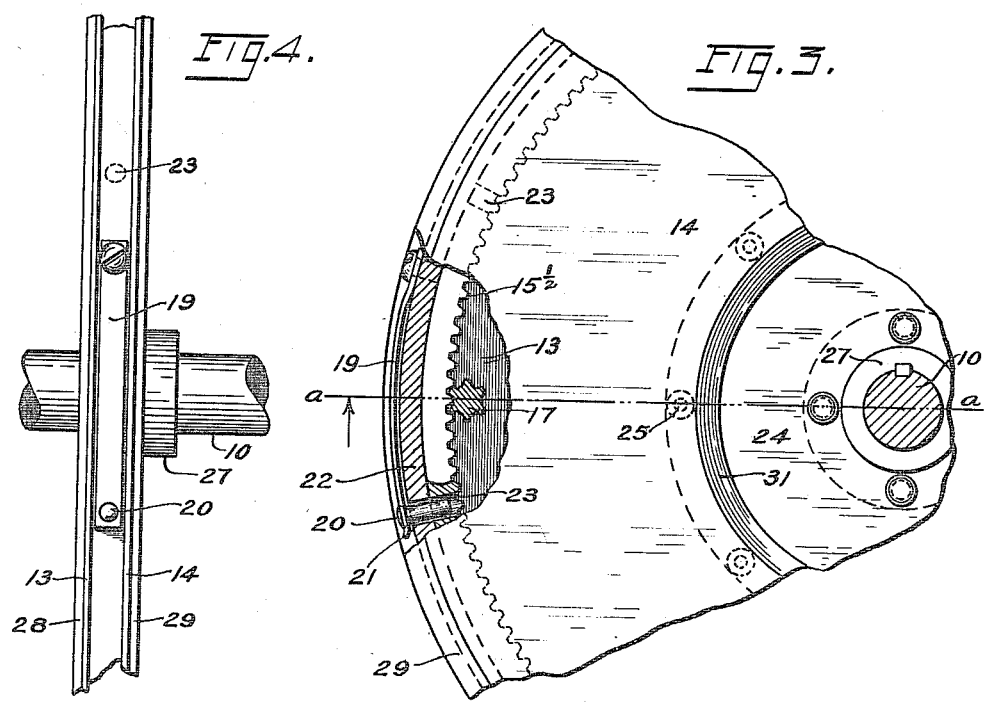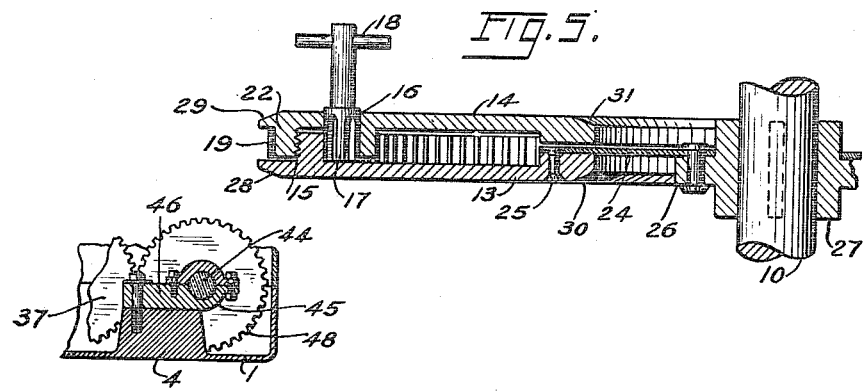

UNITED STATES PATENT OFFICE.

JOHN BARNES, OF ROCKFORD, ILLINOIS.

SPEED-TRANSMISSION MECHANISM.

983,016.

Specification of Letters Patent.   Patented Jan. 31, 1911.

Application filed April 20, 1908.   Serial No. 428,047.

*To all whom it may concern:*

Be it known that I, JOHN BARNES, a citizen of the United States, residing at Rockford, in the county of Winnebago and State of Illinois, have invented certain new and useful Improvements in Speed-Transmission Mechanism, of which the following is a specification.

The object of this invention is to construct a transmission mechanism for motor vehicles and the like, in which friction is employed in starting the driven shaft, and after a given speed is attained the friction drive is cut out and a connection made between the driving and driven shafts.

In the accompanying drawings, Figure 1 is a plan view of my improved transmission mechanism, in which portions are removed and other portions are sectioned.
Fig. 2 is a side elevation, in which the casing is shown in section. Fig. 3 is a face representation of a portion of the friction disk in which parts are broken away and other parts sectioned. Fig. 4 is an edge view of a portion of the friction disk. Fig. 5 is a section of the friction disk showing the means for varying the width or thickness of the disk on dotted line *a a* Fig. 3. Fig. 6 is a section on dotted line *b* Fig. 1.
The frame for supporting the operative parts comprises the casing 1 provided with bearings 2 and 3, and a support 4. From the lower portion of the casing extends two angle bar rails 5 and 6 which are united by the end section 7. The rail 5 supports a bearing 8, and the rail 6 supports a bearing 9. A driven shaft 10 is supported by the bearings 8 and 9. To this driven shaft 10 are fixedly connected a friction disk, and a beveled gear 12. The friction disk is in two sections 13 and 14 which are connected by the screw-threads 15. The section 13 has an internal gear 15½, and the section 14 has an opening 16 through which a spur pinion 17 may be placed in engagement with the internal gear 15½. This spur pinion 17 has a handle 18 by which it may be turned. By rotating this spur pinion 17, the section 13 will be turned axially thereby moving the sections with respect to each other to vary the thickness of disk as a whole. To the outer edge of the section 14 is secured a spring bar 19 having one end provided with a pin 20 which extends through an opening 21 in the edging 22 and into one of the series of openings 23 in the edging of the section 13. This pin 20 serves to lock the two sections 13 and 14 together after being adjusted by the spur pinion 17.

The section 13 is secured to ring 24 by the rivets 25 and the ring is connected to the flange 26 of the hub 27. The outer edges 28 and 29 of the sections 13 and 14 respectively are beveled, likewise the inner edges 30 and 31. The bearings 3 and 9 support a driving shaft extension 32 in a manner to freely rotate therein. On this shaft extension is loosely mounted a bevel pinion 33 which is held in position by the bearing 9 and meshes with the bevel gear 12. On this shaft extension 32 is splined a friction wheel 34 which is capable of being moved in the lengthwise direction of the shaft, and always rotating with the shaft. This friction wheel is adapted to be moved into engagement with the section 13 of the friction disk, and to travel across the face of the section until it leaves the inner edge of the section. One face of this friction wheel is provided with a clutch face 35, which, when the wheel is moved toward the beveled pinion 33, will engage the clutch face 36 of the bevel pinion 33 thereby forming a direct connection between the shaft extension and the bevel pinion 33, and through the bevel gear 12 to the driven shaft 10.

To the shaft extension 32 is pinned a spur gear 37 and is formed with a clutch face 38. A driving shaft 39 is supported in the bearing 2 and by a projection 40 entering a recess in the end of the shaft extension 32. On this driving shaft is loosely mounted a sprocket wheel 41 having a clutch face 42, and a double clutch section 43 has a splined connection with the driving shaft, and is adapted to be moved into engagement with either of the clutch faces 38 or 42.

A secondary shaft 44 has one end supported in a bearing 45 having a side projection 46 pivoted to the support 4 for the bearing. To this secondary shaft are fixedly connected a sprocket wheel 47 and spur gear 48. The other end of this secondary shaft is supported in a box 49 which is located on a ledge 50 formed in the rail 5 of the main frame. This box 49 is adapted to slide on the ledge, and a bell-crank 51 has one arm pivoted to the box 49 and its other arm has a rod 52 connected therewith by which the bell-crank is rocked on its pivot 53 thereby moving the secondary shaft on the pivot 54. This secondary shaft supports a friction wheel 55 which is splined thereto and capable of being moved in the lengthwise direction of the shaft in contact with the section 14 of the friction disk. By moving the box 49 supporting one end of the secondary shaft the frictional wheel 55 will be held free of the friction disk during its movement along the shaft.

The spur gears 37 and 48 are in constant mesh, and a chain 56 connects the sprocket wheels 41 and 47.

The driving shaft is intended to connect with an engine or other motive power, and the driven shaft intended to connect with the supporting wheels of a motor vehicle. The friction wheels 34 and 55 are intended to be connected in any suitable manner to move together along their respective shafts, one on each side of the friction disk.

In starting the rotation of the driven shaft in a direction to give speed ahead, the double clutch section 43 is moved into engagement with the clutch face 38 of the spur gear 37. This connection will rotate the spur gear 48 and will rotate the extension shaft 32 and secondary shaft 44 in opposite directions and toward one another, which will rotate the friction wheels 34 and 55 in like directions. The friction wheels 34 and 55 are then moved onto the faces of the sections 13 and 14 of the friction disk, which will rotate the friction disk, and it in turn will rotate the driven shaft 10, slowly at first. As the friction wheels are moved near the center of the friction disk, the speed of the disk will be increased and the speed of the driven shaft will also be increased. Just as the friction wheels 34 and 55 leave contact with the friction disk at the inner edges of the sections 13 and 14, the clutch face 35 of the friction wheel 34 will engage the clutch face 36 of the bevel pinion 33, thereby forming a connection between the driving shaft with the driven shaft, through the extension shaft 32, friction wheel 34, bevel pinion 33 and bevel gear 12.

In reversing the direction of rotation of the driven shaft, the double clutch section 43 is moved into engagement with the clutch face 42 of the sprocket wheel 41, thereby imparting motion from the driving shaft 39 to the secondary shaft 44 in the same direction. The spur gears 37 and 48 being in mesh and the extension shaft 32 being free to be driven by the secondary shaft, the friction wheels 34 and 55 will revolve in opposite directions, and in directions opposite to that at which they were being driven when the driven shaft was being rotated ahead. When the friction wheels are moved in contact with the friction disk, the disk will be rotated in a reverse direction which will rotate the driven shaft backward, thereby backing the motor vehicle. By moving the secondary shaft 44 on its pivot 54 the friction wheel 55 will be held free of the disk, thereby decreasing the frictional contact of the friction wheel 34 with the friction disk, to an extent that the friction disk will not be rotated. This freeing movement of the friction wheel can take place at any point that the friction wheels are in contact with the friction disk.

By providing the sections 13 and 14 with the beveled edges 28 and 29 respectively, the friction wheels can be moved free of the friction disk while in motion, which will allow the friction disk to remain at rest, and can be moved in engagement with the faces of the sections while they are in motion.

I claim as my invention:

1. The combination of a driving shaft and a driven shaft, an extension of the driving shaft in alinement therewith, a secondary shaft located parallel with the shaft extension, a friction wheel for the shaft extension, a friction wheel for the secondary shaft, both wheels capable of movement in the lengthwise direction of their shafts and rotated thereby, a spur gear fixedly connected to the shaft extension, a spur gear fixedly connected to the secondary shaft and in mesh with the gear on the shaft extension, a driving connection between the driving shaft and shaft extension, and a friction disk fixedly connected with the driven shaft with which the friction wheels engage.

2. The combination of a driving shaft and a driven shaft an extension of the driving shaft in alinement therewith, a secondary shaft located parallel with the shaft extension, a friction wheel for the shaft extension, a friction wheel for the secondary shaft both wheels capable of movement in the lengthwise direction of their shafts and rotated thereby, a spur gear fixedly connected to the shaft extension, a spur gear fixedly connected to the secondary shaft and in mesh with the gear on the shaft extension, a driving connection between the driving shaft and shaft extension, a sprocket wheel loosely mounted on the driving shaft and having a clutch face, a clutch section splined on the driving shaft and adapted to engage the clutch face of the sprocket wheel, a sprocket wheel fixedly connected with the secondary shaft, a chain connecting the sprocket wheels so that both revolve in the same direction, and a friction disk fixedly connected with the driven shaft with which the wheels engage.

3. The combination of two shafts arranged in parallel relation, a friction wheel supported by each shaft, driven thereby and capable of movement along the shafts, and a friction disk disposed between the wheels, the disk comprising two screw-threaded connected sections, means for turning one section with respect to the other section to vary the thickness of the disk, and means for holding the sections when adjusted.

4. The combination of two shafts arranged in parallel relation, a friction wheel supported by each shaft, driven thereby and capable of movement along the shafts, and a friction disk disposed between the wheels, the disk comprising two screw-threaded connected sections, one of the sections having an internal gear, a spur pinion capable of meshing with the internal gear for varying the thickness of the disk, and means for holding the sections when adjusted.

In testimony whereof I have hereunto set my hand in presence of two subscribing witnesses.

JOHN BARNES.

Witnesses:
A. O. BEHEL,
E. D. E. N. BEHEL.